United States Patent
Keyser et al.

(10) Patent No.: US 10,871,554 B1
(45) Date of Patent: Dec. 22, 2020

(54) MULTISPECTRAL LADAR USING WAVELENGTH SHAPING

(71) Applicant: Government of the United States, as represented by the Secretary of the Air Force, Wright-Patterson AFB, OH (US)

(72) Inventors: Christian K. Keyser, Shalimar, FL (US); Luke A. Ausley, Niceville, FL (US); Chad M. Welsh, Niceville, FL (US)

( * ) Notice: Subject to any disclaimer, the term of this patent is extended or adjusted under 35 U.S.C. 154(b) by 404 days.

(21) Appl. No.: 15/915,573

(22) Filed: Mar. 8, 2018

(51) Int. Cl.
*G01S 7/48* (2006.01)
*G01S 7/481* (2006.01)
*G01S 17/06* (2006.01)
*G02F 1/365* (2006.01)

(52) U.S. Cl.
CPC .......... *G01S 7/4802* (2013.01); *G01S 7/4814* (2013.01); *G01S 7/4816* (2013.01); *G01S 7/4818* (2013.01); *G01S 17/06* (2013.01); *G02F 1/365* (2013.01); *G02F 2202/32* (2013.01)

(58) Field of Classification Search
CPC .... G01S 7/414; G01S 13/0209; G01S 13/106; G01S 13/887
See application file for complete search history.

(56) References Cited

U.S. PATENT DOCUMENTS

| | | | |
|---|---|---|---|
| 5,486,833 A * | 1/1996 | Barrett | G01S 7/414 342/204 |
| 6,882,409 B1 | 4/2005 | Evans et al. | |
| 7,652,752 B2 | 1/2010 | Fetzer et al. | |
| 2004/0130702 A1 | 7/2004 | Jupp et al. | |
| 2007/0024840 A1* | 2/2007 | Fetzer | G01S 7/4811 356/4.01 |
| 2009/0115994 A1 | 5/2009 | Stettner et al. | |
| 2012/0056886 A1* | 3/2012 | Shiba | G01S 7/4021 345/419 |

* cited by examiner

*Primary Examiner* — Luke D Ratcliffe
(74) *Attorney, Agent, or Firm* — AFMCLO/JAZ; David E. Franklin

(57) ABSTRACT

A LADAR having a transmitter and a receiver. The transmitter includes a laser for delivering an original beam pulse having a time duration. A nonlinear element receives the original beam pulse and outputs a multispectral incident beam pulse. For each wavelength component of the incident beam pulse, a unique wavelength-dependent variation of intensity is imparted over the time duration of the incident beam pulse. This creates a unique waveform shape for each component. Output optics direct the incident beam pulse onto a target, which reflects from the target as a scattered beam pulse. The receiver includes a single-pixel sensor for receiving the scattered beam pulse and measuring and outputting an intensity of the scattered beam pulse over time, which creates a scattered beam pulse envelope. A processor receives the scattered beam pulse envelope, applies factors to fit the waveform shapes to the scattered beam pulse envelope, and derives a reflectivity of the target for each of the wavelength components from the factors.

25 Claims, 2 Drawing Sheets

MULTISPECTRAL LADAR USING WAVELENGTH SHAPING

GOVERNMENT INTEREST

The invention described herein may be manufactured, used, and licensed by or for the Government of the United States for all governmental purposes without the payment of any royalty.

FIELD

This invention relates to the field of electronic sensors. More particularly, this invention relates to electronically sensing the shape of surfaces from a distance.

INTRODUCTION

LADAR (also referred to as LIDAR and laser radar) is a portmanteau of laser and radar, which is also known as laser detecting and ranging. All LADAR instruments have a transmitter and a receiver, where the transmitter is a laser source used to illuminate an object of interest, referred to as a target, and the receiver includes photodetectors that detect the laser light reflected from the object. One common LADAR variant is called multi-spectral LADAR.

In multi-spectral LADAR, the transmitter creates an incident beam pulse that includes more than one wavelength, where the intensity of each of the wavelengths in the incident beam pulse is known. The incident beam pulse is directed toward the target. When the incident beam pulse is reflected from the target, a scattered beam pulse is created. The intensity of each wavelength in the scattered beam pulse is proportional to the reflectivity of the target at each wavelength. A receiver captures the scattered beam pulse with a lens, which focuses the scattered beam pulse onto an optical element that spatially separates the wavelengths in the scattered beam pulse, such as a grating.

The spatially separated wavelengths impinge upon a collection of sensors, such as a linear detector array, where a given one of the sensors is positioned to receive a given one of the wavelengths in the scattered beam pulse.

In this manner, the intensity of each wavelength for a given scattered beam pulse is measured, and thus the degree of reflectivity of each wavelength can be determined. The reflectivity and time of flight information, such as might be gathered over a number of incident beam pulses, can be used to determine various properties of the target, such as shape, texture, composition, distance, and relative speed and acceleration.

Although such a system is operable, there is constant pressure to reduce at least one of the complexity, cost, size, weight, and power requirements for such systems.

What is needed, therefore, is a LADAR that reduces issues such as those described above, at least in part.

SUMMARY

According to one aspect of the invention there is described a LADAR having a transmitter and a receiver. The transmitter includes a laser for delivering an original beam pulse having a time duration. A nonlinear element receives the original beam pulse and outputs a multispectral incident beam pulse. For each wavelength component of the incident beam pulse, a unique wavelength-dependent variation of intensity is imparted over the time duration of the incident beam pulse. This creates a unique waveform shape for each component. Output optics direct the incident beam pulse onto a target, which reflects from the target as a scattered beam pulse. The receiver includes a single-pixel sensor for receiving the scattered beam pulse and measuring and outputting an intensity of the scattered beam pulse over time, which creates a scattered beam pulse envelope. A processor receives the scattered beam pulse envelope, applies factors to fit the waveform shapes to the scattered beam pulse envelope, and derives a reflectivity of the target for each of the wavelength components from the factors.

In various embodiments according to this aspect of the invention, the laser is a supercontinuum laser. In some embodiments, the laser is a monochromatic laser. In some embodiments, the laser is a multispectral laser. In some embodiments, the nonlinear element is a hollow-core photonic crystal fiber that is filled with a Raman-active gas. In some embodiments, the nonlinear element is a Pockels cell.

In some embodiments the step of applying factors is accomplished by performing a least squares regression. In some embodiments, the transmitter and the receiver are contained within a common housing. In some embodiments, the processor further uses the reflectivity of the target at each of the wavelengths to determine target composition.

In some embodiments, the step of applying factors is accomplished by iteratively, selectively adjusting reflectivity factors, where there is one reflectivity factor for each discrete wavelength in the scattered beam pulse. The reflectivity factors are applied to the waveform shapes to create computed waveform shapes, which are added together to form a computed beam pulse envelope. The computed beam pulse envelope is compared to the scattered beam pulse envelope. When the computed beam pulse envelope fits the scattered beam pulse envelope to a desired degree of accuracy, the reflectivity factors are output as the reflectivity of the target at each of the discrete wavelengths.

According to another aspect of the invention, a LADAR includes a transmitter for outputting an incident beam pulse comprised of wavelengths, where each of the wavelengths exhibits a unique variation of intensity over a time duration of the incident beam pulse, which is designated as a waveform shape. The transmitter directs the incident beam pulse onto a target. A receiver receives a scattered beam pulse from the target, measures a single point intensity of the scattered beam pulse over a time duration of the scattered beam pulse, creates a scattered beam pulse envelope, and fits the waveform shapes to the scattered beam pulse envelope to a desired degree of accuracy.

In various embodiments according to this aspect of the invention, the incident beam pulse is created by one of a supercontinuum laser, a multispectral laser, and a monochromatic laser. In some embodiments, the unique variation of intensity for each of the wavelengths is created by a hollow-core photonic crystal fiber that is filled with a Raman-active gas. In some embodiments, the unique variation of intensity for each of the wavelengths is created by a Pockels cell. In some embodiments, fitting the waveform shapes to the scattered beam pulse envelope to a desired degree of accuracy is accomplished with least squares regression.

According to yet another aspect of the invention there is described a method for deconvolving a beam pulse comprised of a plurality of wavelengths, by using a nonlinear element to impart different beam shapes to each of the wavelengths. The beam pulse is received with a single pixel sensor to produce a beam pulse envelope, and the beam shapes are fitted to the beam pulse envelope to a desired degree of accuracy.

In various embodiments according to this aspect of the invention, the beam pulse is created by one of a supercontinuum laser, a multispectral laser, and a monochromatic laser. In some embodiments, the different beam shapes are created by a hollow-core photonic crystal fiber that is filled with a Raman-active gas. In some embodiments, the different beam shapes are created by a Pockels cell. In some embodiments, the step of fitting the beam shapes to the beam pulse envelope to a desired degree of accuracy is accomplished with least squares regression.

DRAWINGS

Further advantages of the invention are apparent by reference to the detailed description when considered in conjunction with FIG. 1s, which are not to scale so as to more clearly show the details, wherein like reference numbers indicate like elements throughout the several views, and wherein.

DESCRIPTION

Figure 1:
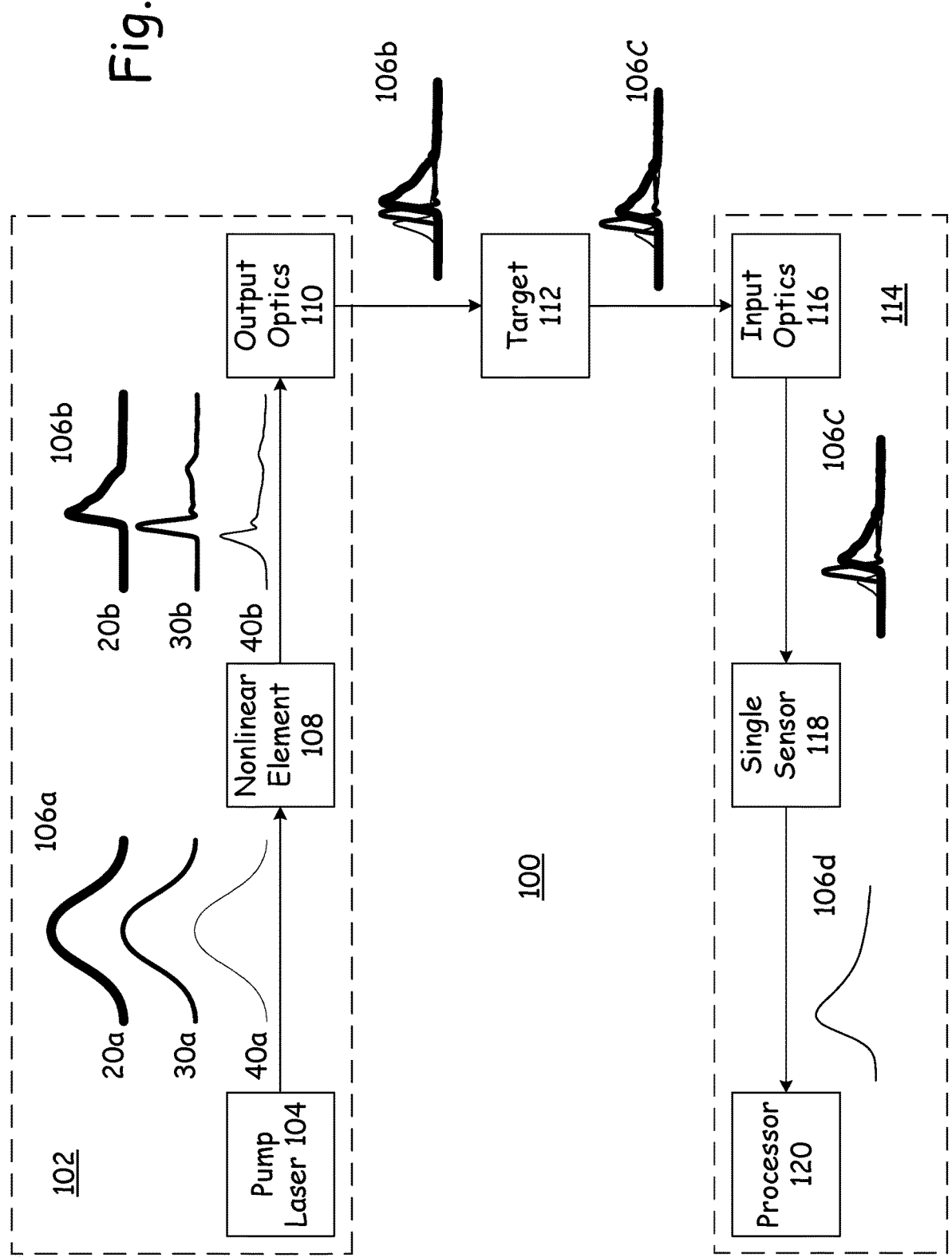
FIG. 1 is a functional block diagram of a LADAR system according to an embodiment of the present invention.

With reference now to FIG. 1, a LADAR 100 includes a transmitter 102 with a single pump laser 104 that creates an original beam pulse 106a. The original beam pulse 106a is received by a nonlinear element 108 (described in more detail below) that outputs an incident beam pulse 106b containing more than one wavelength 20, 30, and 40 (each peak wavelength also referred to as a spectral component herein), where the amplitude across the time duration of the incident beam pulse 106b of each of the spectral components is based at least in part on the wavelength of the spectral component 20, 30, and 40. This is referred to herein as a waveform shape, and each spectral component 20b, 30b, and 40b in the incident beam pulse 106b has a different waveform shape.

The incident beam pulse 106b is directed by output optics 110, such as scanning optics, toward a target 112. Portions of the wavelengths 20, 30, and 40 are absorbed to some varying degree by the target 112, and portions of the wavelengths 20, 30, and 40 are reflected and scattered by the target 112, to produce a scattered beam pulse 106c.

In the embodiment depicted in FIG. 1, wavelength 30—depicted as the medium weight line in the scattered beam pulse 106c—is substantially 100% scattered by the target 112, which means that the target 112 did not absorb a significant portion of the wavelength 30. In actual implementation, it would be extremely rare that a target 112 would reflect substantially 100% of an incident wavelength, but that example is used in this embodiment so as to more clearly see the distinctions between the reflectivity of the various wavelengths 20, 30, and 40.

Also as depicted, wavelength 20—depicted as the heaviest weight line in the scattered beam pulse 106c—is absorbed by the target 112 to some intermediate degree, and so a lesser portion of the wavelength 20 is scattered by the target 112. Finally, wavelength 40—depicted as the lightest weight line in the scattered beam pulse 106c—is absorbed to a greater degree than the other two wavelengths 20 and 30, and so an even lesser portion of the wavelength 40 is scattered by the target 112.

These variations in the absorption and reflection of the target 112 at different wavelengths is manifested as intensity peaks that are reduced by some differing amount for each wavelength 20, 30, and 40, when comparing the scattered beam pulse 106c to the incident beam pulse 106b.

A receiver 114 captures portions of the scattered beam pulse 106c, such as with optics 116, and the captured portion of the scattered beam pulse 106c is directed to just one single-pixel sensor 118. Multiple single-pixel sensors 118 are not used, nor is any type of array of sensors 118. The embodiments of the present invention require only one single-pixel sensor 118.

The single-pixel sensor 118 measures the intensity of the scattered beam pulse 106c over the time duration of the scattered beam pulse 106c, producing what is referred to herein as a beam pulse envelope 106d. The beam pulse envelope 106d represents the sum of the amplitudes of each of the spectral components 20, 30, and 40 present in the reflected beam pulse 106c. The beam pulse envelope 106d is received by a processor 120 and yields information in regard to the reflectivity of the target 112 at each of the wavelengths included in the scattered beam pulse 106c.

In some embodiments, the laser 104 is a multispectral laser or a supercontinuum laser, and the nonlinear element 108 is a Pockels cell in combination with orthogonal polarizers on the input and output ends of the cell. A voltage ramp is applied to the cell, which voltage ramp is synchronized with the original beam pulse 106a as it travels through the cell. In one embodiment, the cell functions as a voltage-controlled waveplate, as one or more half-wave voltages are applied to the cell. The amplitude of the incident beam pulse 106b that is output by the cell is modulated into a wavelength-specific shape, as the half-wave voltage varies with each discrete wavelength 20a, 30a, and 40a in the original beam pulse 106a. Thus, the Pockels cell modulates the spectral components 20a, 30a, and 40a of the original laser pulse 106a, according to the wavelength of the given spectral component 20a, 30a, and 40a, to produce a different waveform shape for each of the spectral components 20b, 30b, and 40b of the incident laser pulse 106b, as depicted.

In another embodiment, the laser 104 is a monochromatic laser and the nonlinear element is a Raman fiber, such as a hollow-core photonic crystal fiber that is filled with a Raman-active gas. In this embodiment, the original beam pulse 106a includes only one spectral component, such as 20a, and not the other spectral components 30a and 40a. The Raman fiber receives the spectral component 20a of the monochromatic original laser pulse 106a and produces more than one spectral component 20b, 30b, and 40b in the incident beam pulse 106b, where each of the spectral components 20b, 30b, and 40b has a different waveform shape, as depicted. This can be accomplished, for example, with cascaded Raman scattering, four-wave mixing, or a combination of such.

Thus, each of the spectral components 20b, 30b, and 40b in a given incident beam pulse 106b has a unique waveform shape, one from another, but a given one of the spectral components 20b, 30b, and 40b has the same waveform shape from pulse to pulse.

In one embodiment, the incident beam pulse 106b only includes some limited number of discrete wavelengths. This can be accomplished in many different ways, such as filtering the incident beam pulse 106b, filtering the original beam pulse 106a that is produced by a supercontinuum laser 104, or using a multispectral laser 104.

It is appreciated that only three spectral components 20, 30, and 40 are depicted in each of the beam pulses 106a, 106b, and 106c, but this is only so as to not unduly encumber the drawing, and a greater or lesser number of spectral components is contemplated herein.

In the embodiment depicted, each of the three wavelengths 20a, 30a, and 40a have substantially the same original waveform shape, depicted generally as a somewhat gaussian-shaped curve, meaning that the laser 104 has produced each of the wavelengths 20a, 30a, and 40a with the same intensity profile over the duration of the original beam pulse 106a. In some embodiments the shapes of the spectral components 30a, 30b, and 30c are different, at least in part, one from another.

As depicted within the boundaries of the transmitter 102, the wavelengths 20, 30, and 40 are spread out vertically for clarity. There is no real-world analog of this, and the vertical depiction is used solely for the purpose of clarity in the figure, so that the change in waveform shape can be more readily understood. Similarly, different line weights are used for the different wavelengths 20, 30, and 40 in FIG. 1. Again, this is so that it is easier to see in FIG. 1 the difference in the waveform shapes between the three wavelengths 20, 30, and 40, whereas lines of similar weight would tend to obscure the waveform shape differences.

Outside of the boundaries of transmitter 102, as depicted in FIG. 1, the incident beam pulse 106b is depicted with all of the wavelengths 20, 30, and 40 on top of each other, which is a more realistic representation of how a multispectral beam appears to a sensor 118 that cannot discriminate one wavelength from another, but can only detect the sum of the intensities of the received wavelengths. In such a case, the sensor 118 would only see peaks and valleys in the intensity of the scattered beam pulse 106c over time, which peaks and valleys constitute the scattered beam pulse envelope 106d.

This scattered beam pulse envelope 106d has a shape that is dependent, at least in part, upon the waveform shapes of the wavelengths 20b, 30b, and 40b in the incident beam pulse 106b, and the degree of reflectivity of each of the wavelengths 20, 30, and 40 from the target 112.

The waveform shape of each of the discrete wavelengths 20b, 30b, and 40b in the incident beam pulse 106b is known in at least one of several different ways. For example, in one embodiment, the waveform shape of each of the discrete wavelengths 20b, 30b, and 40b in the incident beam pulse 106b is known from the design of the laser 104, and the design of the nonlinear element 108. In another embodiment, the waveform shape of each of the discrete wavelengths 20b, 30b, and 40b in the incident beam pulse 106b is known from direct measurement of the actual pulse 106a or 106b. In another embodiment, the waveform shape of each of the discrete wavelengths 20b, 30b, and 40b in the incident beam pulse 106b is known from measurements of many such incident beam pulses 106b that have been averaged. The shape of the scattered beam pulse envelope 106d is known from the measurements of the single-pixel sensor 118.

With this information, a least squares fit can be made to correlate the waveforms 20b, 30b, and 40b to the beam pulse envelope 106d, and thus the degree to which the target 112 has absorbed and reflected each of the spectral components can be determined.

Figure 2:
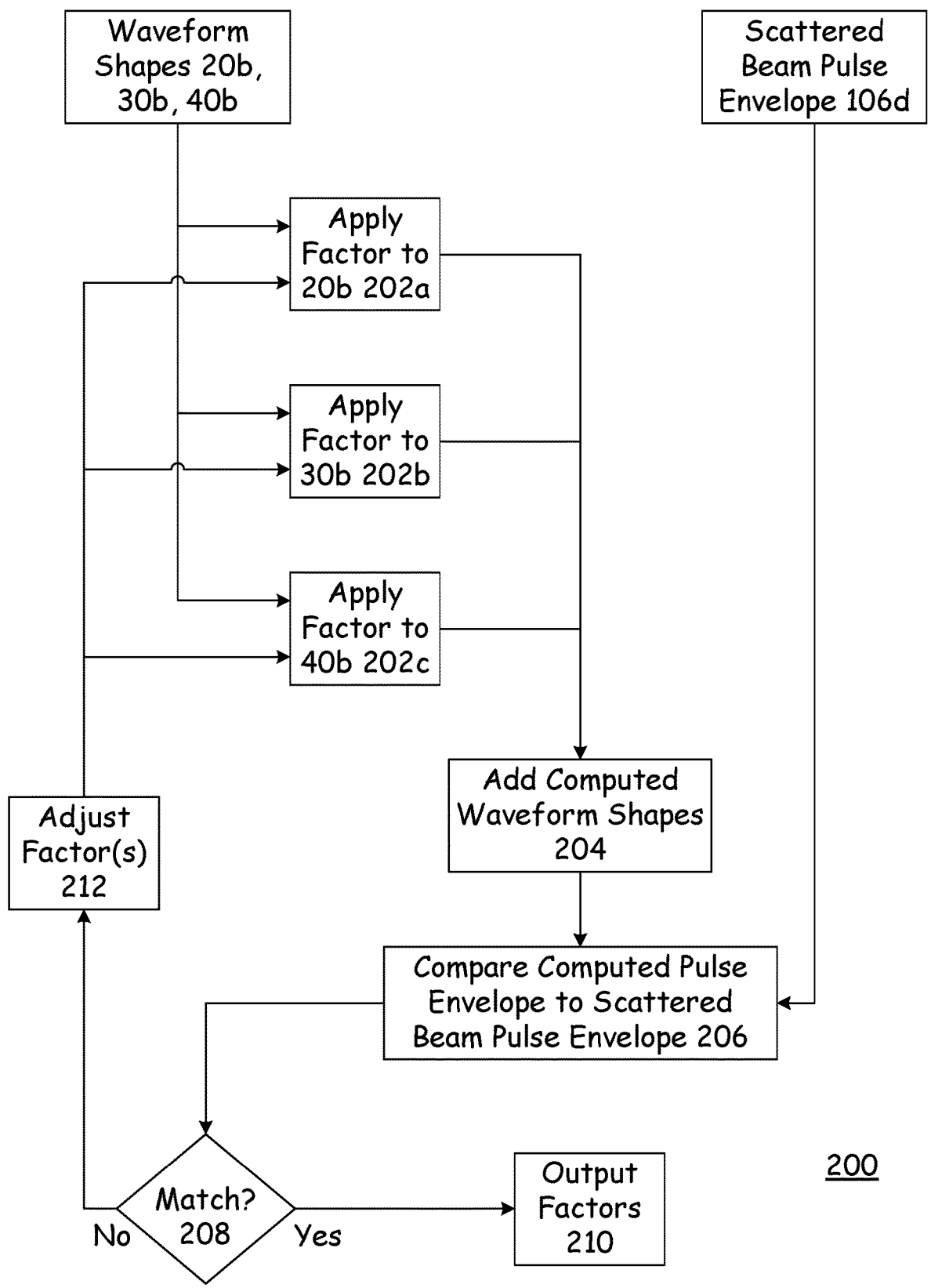
FIG. 2 is a flow-chart of a method according to an embodiment of the present invention.

With reference now to the embodiment depicted in FIG. 2, there is depicted one generalized method for determining the degree to which the target 112 reflected the wavelengths 20, 30, and 40. It is appreciated that there are many other methods by which this could be accomplished. In this embodiment, the processor 120 takes as input from the single-pixel sensor 118 the scattered beam pulse envelope 106d, and the waveform shapes 20b, 30b, and 40b, and applies method 200. In some embodiments waveform shapes 20b, 30b, and 40b are known, as mentioned above, and so the processor 120 can be preprogrammed with those shapes, or have them accessible in a memory in the receiver 114.

Reflectivity factors are independently applied, as given in blocks 202, to each of the wavelength shapes 20b, 30b, and 40b in the incident beam pulse 106b. This process produces a computed waveform shape for each of the wavelengths 20, 30, and 40.

These computed waveform shapes are then added together, as given in block 204, to produce a computed beam pulse envelope. which is compared to the scattered beam pulse envelope 106d. This process, in one embodiment, is as simple as comparing quantified intensities at various points in time along the durations of both the computed beam pulse envelope and scattered beam pulse envelope 106d, subtracting one from the other (it doesn't much matter which, as long as it is consistently applied), and producing a string of numbers that represents the differences between the two envelopes at different points in time along the duration of the scattered beam pulse envelope 106d.

The differences between the scattered beam pulse envelope 106d and the computed beam pulse envelope are compared to some type of standard to determine whether they are within a desired degree of agreement, as given in block 208. This desired degree of agreement can take many different forms, according to the desires of the user. For example, in one embodiment the list of differences is squared and averaged, and if the average of the list of differences is below a threshold, then the differences between the two envelopes is acceptable. In another embodiment, each difference value is compared to a threshold, and if any of the difference values exceeds the threshold, then the differences between the two envelopes is not acceptable. Other criteria, and combination of the same, are used in other embodiments.

If the two envelopes do not match to the desired degree, then the method 200 proceeds to block 212, where one or more of the reflectively factors is adjusted, and the adjusted factor(s) are reapplied as given in the appropriate one or more of blocks 202. This process is iteratively repeated until the computed pulse envelope fits the scattered beam pulse envelope 106d to a desired degree of agreement. Once this has been accomplished, the reflectivity factors then represent the reflectivity of the target 112 at each of the wavelengths 20, 30, and 40, and the factors are output, as given in block 210.

This process takes into account the calibrated spectral transmission of the transmitter and spectral responsivity of the receiver. In addition, the round trip time between transmit and receipt of signals is used to estimate the range of the target. In one embodiment, the range is used to remove a common range dependent attenuation factor from the measured signals.

Thus, embodiments according to the present invention replace heavier, larger, and more expensive parts, such as gratings and multi-pixel sensor arrays, with a nonlinear element 108 and a single-pixel sensor, which are generally lighter, smaller, and less expensive than the parts that they are replacing. This is an important benefit for technologies such as missiles and autonomous vehicles.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A LADAR, comprising:
a transmitter, comprising:
a laser for delivering an original beam pulse having a time duration,
a nonlinear element for receiving the original beam pulse and outputting a multispectral incident beam pulse, and for each wavelength component of the incident beam pulse, imparting a unique wavelength-dependent variation of intensity over the time duration of the incident beam pulse, thereby creating a unique waveform shape for each component, and
output optics for directing the incident beam pulse onto a target, the incident beam pulse thereby reflecting from the target as a scattered beam pulse,
a receiver, comprising:
a single-pixel sensor for receiving the scattered beam pulse and measuring and outputting an intensity of a combination of reflected wavelength components of the scattered beam pulse over time, thereby creating a scattered beam pulse envelope, and
a processor communicatively coupled to the transmitter and the receiver and which:
receives the scattered beam pulse envelope,
accesses factors of a respective waveform shape of each wavelength component of the incident beam pulse;
applies the factors to fit the waveform shapes to the scattered beam pulse envelope, and
derives a reflectivity of the target for each of the wavelength components from the factors.

2. The LADAR of claim 1, wherein the laser is a supercontinuum laser having an output that is filtered to produce the original beam pulse comprised of discrete wavelengths.

3. The LADAR of claim 1, wherein:
the laser is a monochromatic laser; and
the nonlinear element is a Raman fiber having a hollow-core photonic crystal fiber that is filled with a Raman-active gas, the Raman fiber generating the waveform components having different waveform shapes.

4. The LADAR of claim 1, wherein:
the laser is a multispectral laser having an output of discrete wavelengths; and
the nonlinear element outputs different waveform shapes within the single beam pulse with the waveform components being identical pulse to pulse.

5. The LADAR of claim 1, wherein:
the laser is one of: (i) a multispectral laser; and (ii) a supercontinuum laser; and
the nonlinear element is a Pockels cell comprising a pair of orthogonal polarizers respectively on an input end and an output end of the Pockels cell, a voltage ramp is applied to the Pockels cell that is synchronized with the original beam pulse traveling through the Pockels cell.

6. The LADAR of claim 1, wherein the processor applies the factors is accomplished by performing a least squares regression.

7. The LADAR of claim 1, wherein the processor applies the factors by:
iteratively,
selectively adjusting reflectivity factors, where there is one reflectivity factor for each wavelength in the scattered beam pulse,
applying the reflectivity factors to the waveform shapes to create computed waveform shapes,
adding the computed waveform shapes together to form a computed beam pulse envelope, and
comparing the computed beam pulse envelope to the scattered beam pulse envelope, and
when the computed beam pulse envelope fits the scattered beam pulse envelope to a desired degree of accuracy, outputting the reflectivity factors as the reflectivity of the target at each of the discrete wavelengths.

8. The LADAR of claim 1, wherein the transmitter and the receiver are contained within a common housing.

9. The LADAR of claim 1, wherein the processor further uses the reflectivity of the target at each of the wavelengths to determine target composition.

10. The LADAR of claim 1, wherein the factors of the respective waveform shape of each wavelength component of the incident beam pulse is known from a design of the laser and a design of the nonlinear components.

11. The LADAR of claim 1, wherein the factors of the respective waveform shape of each wavelength component of the incident beam pulse is known from direct measurement of at least one of the original beam pulse from the laser and the incident beam pulse from the nonlinear element.

12. The LADAR of claim 1, wherein the factors of the respective waveform shape of each wavelength component of the incident beam pulse is known from an average of measurements of previous incident beam pulses from the nonlinear element.

13. The LADAR of claim 5, wherein the Pockels cell functions as a voltage-controlled waveplate having the voltage ramp comprising one or more half-wave voltages that modulate the incident beam pulse into a wavelength-specific shape, wherein each wavelength component has a different waveform shape.

14. A method, comprising:
delivering, by a laser, an original beam pulse having a time duration from a laser to a nonlinear element,
imparting, by the nonlinear element, a unique wavelength-dependent variation of intensity over the time duration of the original beam pulse to output a multispectral incident beam pulse to output optics;
directing, by the output optics the incident beam pulse onto a target, the incident beam pulse thereby reflecting from the target as a scattered beam pulse;
receiving the scattered beam pulse by a single-pixel sensor of a receiver;
measuring an intensity of a combination of reflected wavelength components of the scattered beam pulse over time, thereby creating a scattered beam pulse envelope;
accessing factors of a respective waveform shape of each wavelength component of the incident beam pulse by a processor of the receiver;
applying the factors to fit the waveform shapes to the scattered beam pulse envelope; and
deriving a reflectivity of the target for each of the wavelength components from the factors.

15. The method of claim 14, wherein delivering the original beam pulse comprises:
  generating an output by the laser comprising a supercontinuum laser; and
  filtering the output to produce the original beam pulse comprised of discrete wavelengths.

16. The method of claim 14, wherein:
  the laser is a monochromatic laser; and
  the nonlinear element is a Raman fiber having a hollow-core photonic crystal fiber that is filled with a Raman-active gas, the Raman fiber generating the waveform components having different waveform shapes.

17. The method of claim 14, wherein:
  the laser is a multispectral laser having an output of discrete wavelengths; and
  the multispectral incident beam pulse is comprised of the waveform components having different waveform shapes within the single beam pulse with the waveform components being identical pulse to pulse.

18. The method of claim 14, wherein:
  the laser is one of: (i) a multispectral laser; and (ii) a supercontinuum laser; and
  the nonlinear element is a Pockels cell comprising a pair of orthogonal polarizers respectively on an input end and an output end of the Pockels cell;
  the method further comprising applying a voltage ramp to the Pockels cell that is synchronized with the original beam pulse traveling through the Pockels cell.

19. The method of claim 18, wherein applying the voltage ramp comprises operating the Pockels cell as a voltage-controlled waveplate using the voltage ramp comprising one or more half-wave voltages that modulate the incident beam pulse into a wavelength-specific shape, wherein each wavelength component has a different waveform shape.

20. The method of claim 14, wherein applying the factors comprises performing a least squares regression.

21. The method of claim 14, wherein applying the factors further comprises:
  iteratively,
    selectively adjusting reflectivity factors, where there is one reflectivity factor for each wavelength in the scattered beam pulse,
    applying the reflectivity factors to the waveform shapes to create computed waveform shapes,
    adding the computed waveform shapes together to form a computed beam pulse envelope, and
    comparing the computed beam pulse envelope to the scattered beam pulse envelope, and
  when the computed beam pulse envelope fits the scattered beam pulse envelope to a desired degree of accuracy, outputting the reflectivity factors as the reflectivity of the target at each of the discrete wavelengths.

22. The method of claim 14, further comprising using the reflectivity of the target at each of the wavelengths to determine target composition.

23. The method of claim 14, wherein accessing the factors of the respective waveform shape of each wavelength component of the incident beam pulse comprises accessing data known from a design of the laser and a design of the nonlinear components.

24. The method of claim 14, wherein accessing the factors of the respective waveform shape of each wavelength component of the incident beam pulse comprises directly measuring of at least one of the original beam pulse from the laser and the incident beam pulse from the nonlinear element.

25. The method of claim 14, wherein accessing the factors of the respective waveform shape of each wavelength component of the incident beam pulse comprises averaging measurements of previous incident beam pulses from the nonlinear element.

* * * * *